United States Patent [19]

Krist et al.

[11] Patent Number: 4,486,542

[45] Date of Patent: Dec. 4, 1984

[54] ENAMEL FRIT AND A ONE-BAKE TWO- AND MULTILAYER ENAMELLING PROCESS

[75] Inventors: Otto Krist, Overath; Herbert Salzburg, Cologne, both of Fed. Rep. of Germany

[73] Assignee: Bayer Aktiengesellschaft, Leverkusen, Fed. Rep. of Germany

[21] Appl. No.: 534,231

[22] Filed: Sep. 21, 1983

[30] Foreign Application Priority Data

Oct. 14, 1982 [DE] Fed. Rep. of Germany ....... 3238097

[51] Int. Cl.³ ............................................... C03C 5/00
[52] U.S. Cl. ...................................... 501/17; 501/20; 427/419.4
[58] Field of Search .................. 501/17, 20; 427/419.4

[56] References Cited

FOREIGN PATENT DOCUMENTS

| 0064649 | 11/1982 | European Pat. Off. | 501/20 |
| 2419983 | 10/1979 | France | 501/20 |
| 562174 | 5/1975 | Switzerland | 501/20 |

Primary Examiner—James Poer
Attorney, Agent, or Firm—Sprung, Horn, Kramer & Woods

[57] ABSTRACT

In the enamelling of metal by applying a ground coat containing an additive, subsequently applying a cover coat, and baking the structure, the improvement which comprises employing as the additive a complexing agent having a solubility in water at 25° C. and at a pH-value of from 4 to 9 of greater than about 0.05 g/l, with the exception of saccharides and their oxidation, reduction and modification products and polyethylene glycol containing up to 50 carbon atoms per molecule.

11 Claims, No Drawings

ENAMEL FRIT AND A ONE-BAKE TWO- AND MULTILAYER ENAMELLING PROCESS

This invention relates to an enamel frit and to a one-bake at least two layer enamelling process in which certain organic substances are added to the ground coat slip to be initially applied to the metal. These organic substances do not significantly affect the rheology of the slip or the wettability both of the metal and of the intermediate or cover coat applied as the next layer (or intermediate layer), but effectively prevent the various layers of enamel from becoming intermixed during the baking process.

EP Application No. 82 103 487.3 (which corresponds to U.S. patent application Ser. No. 371,029 filed Apr. 22, 1982, now U.S. Pat. No. 4,430,438, describes a process of the type in question in which saccharides and/or their oxidation, reduction and/or modification products (for example alkylated or esterified carbohydrates or formaldehyde condensates) and/or polyethylene glycols are added during preparation of the slip for the ground coat and, optionally, the intermediate coat, the additives having to contain up to 50 and, preferably, up to at most 25 carbon atoms per molecule. The additives are required to be at least partly soluble in the aqueous-alkaline enamel slip and should not have a hydrophobising effect.

It has now been found that the additives described in the EP Application mentioned above are only part of a larger family of substances.

This larger family of substances is the class of complex-forming substances described as complexing agents or chelating agents in "Chemistry of the Metal Chelate Compounds" (1952) by A. E. Martel and M. Calvin.

Accordingly, complex-forming substances in the context of the present invention are the class of complexing agents and chelating agents described in the above-mentioned EP Application and also substances which, although not described in detail therein, would nevertheless be included in that class by the expert.

The substances from the class of complexing agents may be used for the purposes of the present invention providing their solubility in water at a temperature of 25° C. and at a pH-value of from 4 to 9 is greater than 0.05 g/l.

Accordingly, the present invention provides a process for one-bake at least two layer enamelling by the successive wet application of ground coat, optionally intermediate coat and cover coat slips, followed by the baking of all three slips together, characterized in that complexing agents having a solubility in water of greater than 0.05 g/l at 25° C. and at a pH-value of from 4 to 9 are added during preparation of the slips for the ground coat and, optionally, intermediate coat, those additives which are already described in European Patent Application No. 82 103 487.3 and in the corresponding U.S. patent application Ser. No. 371,029 being excluded from the scope of the present invention.

Suitable complexing agents are substances having the structure of types A or B below

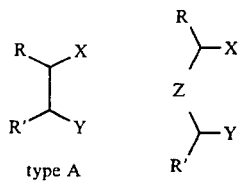

in which R and R' are the same or different and represent organic radicals, such as alkyl, aryl, aralkyl, cycloalkyl (parts of ring systems), H, N- or S-heterocycles; in addition, the organic radicals may be X-, Y- or Z-containing groups. X and Y may be identical or different structural units from the group comprising —OR, —NRR', —SR, =O, =NR, =S, =NOR, —NROR, —COOR. Z may be NR, O, S, $(CH_2)_a$ with $a=1$ to 5.

The substances of type A include aminopolyethers of which the amino groups may be primary, secondary and/or tertiary, acylated, alkylated or converted into imines; α-hydroxy carboxylic acids, such as for example hydroxy acetic acid, lactic acid, and amino acids such as glycine, alanine, serine, lysine and also cysteine, cystine and penicillamine.

The substances of type A also include aminosaccharides and pseudosaccharides in which the ratio of the number of amino groups to the number of hydroxyl groups is less than 1:2. The amino groups or hydroxyl groups of such substances may optionally be alkylated, esterified with inorganic or organic acids or carbonic acid or acetalized. At least one arrangement of the above mentioned type A or B exists in these substances within each section of 6 carbon atoms. In the case of saccharides, it does not matter whether they are of natural or synthetic origin. So far as the polysaccharides in question are concerned, it is possible in particular to use not only sugar-like polysaccharides, but also non-sugar-like polysaccharides of the type described, for example, in "Lehrbuch der organischen Chemie" (1963) by P. Karrer, page 388 and pages 394 et. seq.

Examples of non-sugar-like polysaccharides are high molecular weight starches emanating from potatoes, wheat, corn, rice, and also mucopolysaccharides and amylases.

Complexing agents in the context of the present invention are also substances of type $A_1$ below in which Y is an alkyl radical or hydrogen attached to a non-C-atom:

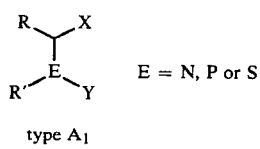

Typical representatives of this type $A_1$ are, for example, the particularly preferred lactams, such as ε-caprolactam, pyrrolidone or dodecane lactam.

If, in cyclic compounds of this type, the ring is closed from R to Y and not from R to R', the products obtained are, for example, pyrazolones and antipyrines which may also be used as complexing agents in accordance with the invention.

Further representatives according to the invention of type $A_1$ are, for example, pyridine-2-carboxylic acid and N-hydroxyphthalimide, in which case Y has the meaning defined in the description of type A.

Substances which contain both the structural element of type A and also that of type B are, for example, tartaric acid, mucic acid, citric acid and the above-mentioned mucopolysaccharides.

Typical representatives of type B are, for example, acetyl acetone, acetoacetic acid, barbiturates, pyrocarbonic acid esters and amides, acyl ureas, biurets, hydroxy biurets, complexones and also levulinic acid derivatives and hydroxy- and aminocarboxylic acids.

Complexing agents suitable for use in accordance with the invention also include substances of type C below:

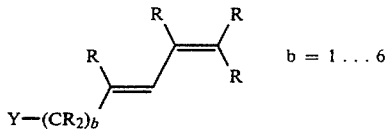

in which R and Y are as already defined. Examples of substances of this type are sorbic acid and abietic acid.

The additives are best used in quantities of less than 5% by weight, based on the enamel slip. Quantities of from 0.1 to 3% by weight are preferred and quantities of from 0.2 to 1.5% by weight are particularly preferred.

The additives may be added to the enamel during dry or wet grinding. However, the additives may also be applied in aqueous or alcoholic solution to the already applied enamel slip, optionally after intermediate drying, before application of the next slip, for example by spraying. It is particularly preferred to apply the additives to the enamel frit before grinding, i.e. to the unground enamel frit. In this way, the additive may be metered by the actual enamel manufacturer. Accordingly, the choice of additives and the quantities in which they are used may be adapted to the particular composition of the raw frit, thereby relieving the relatively unprepared enamelling shop of this task. In addition, it is possible to use less water-soluble additives, even when the frit is wet-ground.

The present invention also provides an enamel frit for one-bake at least two layer enamelling which is characterized in that the frit is surface-coated at least partly with complexing agents of which the solubility in water at 25° C. and at a pH value of from 4 to 9 is greater than 0.05 g/l, the enamel frits already described in EP NO. 82 103 487 corresponding to U.S. Application Ser. No. 371,029 filed 22.4.82 being excluded.

The additives are best applied in quantities of less than 3% by weight, based on the frit. Quantities of from 0.1 to 3% by weight are preferred and quantities of from 0.15 to 2.2% by weight are particularly preferred.

The frit according to the invention may be processed in the usual way in the enamelling shop by grinding and adding other standard slip constituents to form a slip ready for application.

The ground coat slip is applied to the metal substrate by standard methods. After a short time, another intermediate coat or cover coat slip may be applied without intermediate drying. Where an intermediate coat is applied, one of the additives according to the invention must also be added to the intermediate slip or a frit according to the invention must be used for preparing the slip for the intermediate coat. The cover coat slip may also contain the additives according to the invention without any disadvantages. This is advisable, for example, when another layer, for example a decorative colored layer, only partly covering the cover coat is applied thereto.

After all the layers applied have been dried together, they are baked at the usual temperatures. The enamelling result (adhesion, surface properties, etc.) is entirely comparable with the qualities obtainable in conventional enamelling.

The process according to the invention has the following advantages over conventional one-bake two-layer enamelling processes:

1. Enamel slips ground to the usual fineness may be used.
2. Intermediate drying of the ground coat slip initially applied is only necessary in exceptional cases (where the layer thicknesses are fairly considerable).
3. By virtue of the non-hydrophobizing effect of the additives, the residual water is able to escape freely from the dried enamel biscuit during baking, in contrast to impregnating agents.
4. Hardly any harmful reaction products of the additive are formed during baking because, depending on the degree of polymerization, the complexing agents already contain a large proportion of the oxygen required for their complete combustion in the molecule; also, excessive reduction of metal oxides of the enamel by the organic additives, which of course have to be burnt completely in the end, is avoided in this way.

The invention is not confined to enamels in the accepted sense, but is also applicable to related systems, such as cermets for example.

In the form described above, the process according to the invention may be generally used with outstanding results for standard sheet-metal enamelling. However, it has been found that the range of variation of the other parameters, such as sheet metal quality, sheet-metal pretreatment, adjustment of the slip by the other usual slip additives and the baking conditions, may be considerably broadened if the ground coat powder has a certain particle size distribution after grinding.

Accordingly, the particle size of the enamel powder should preferably be below $70\mu$. It is particularly preferred to use particle sizes below $60\mu$ which are obtained by grinding the frit until the sieve residue on a 244 mesh sieve (10,000 meshes/cm$^2$) amounts to at most 3% by weight and by separating off the residue.

Eminently suitable particle size distributions are characterized by the following parameters: 100% by weight smaller than $60\mu$; at least 75% by weight, preferably at least 85% by weight, larger than $20\mu$; and at least 50% by weight, preferably at least 70% by weight, smaller than $50\mu$.

Another possibility of easing the requirements which the quality and pretreatment of the sheet metal have to satisfy lies in the choice of particularly suitable compositions for the raw frits. It has been found that, where the frit compositions described in detail hereinbelow are used, it is even possible to enamel cast iron and non-decarburized steel without any faults using the one-bake at least two layer process according to the invention.

The raw frits used in accordance with the invention for the ground coat preferably have the following composition:

| | | |
|---|---|---|
| SiO$_2$ | 30–50% by weight | total 33–53% by weight |

| | |
|---|---|
| ZrO$_2$ | 0–8% by weight |
| B$_2$O$_3$ | 5–21% by weight ⎫ |
| BaO | 14–25% by weight ⎬ total 33–40% by weight |
| ZnO | 0–5% by weight ⎪ |
| F | 0–4% by weight ⎭ |
| alkali metal oxides | 10–15% by weight |
| adhesive oxides | 1–4% by weight |
| CaO | 0–5% by weight ⎫ |
| SrO | 0–5% by weight ⎪ |
| TiO$_2$ | 0–5% by weight ⎬ total 0–7% by weight |
| Fe$_2$O$_3$ | 0–5% by weight ⎪ |
| P$_2$O$_5$ | 0–2% by weight ⎭ |

The adhesive oxides normally used are CoO, NiO, MnO and/or CuO.

The alkali metal oxides preferably contain at most 80% of Na$_2$O and, in addition, Li$_2$O and/or K$_2$O.

The percentages by weight quoted above should total at least 98 and preferably 100. Other constituents may optionally be present in the quantities in which they are introduced into the raw frit as unavoidable constituents of the raw materials used.

According to the invention, it is particularly preferred to surface-treat the raw frits for the process according to the invention with complexing agents.

Since frit mixtures are normally used for preparing the ground coat slip, the preferred frits according to the invention should make up at least 50% by weight and preferably at least 60% by weight of the frit mixture.

The combination preferably applied in accordance with the invention of the preferred frit treated with complexing agents followed by adjustment of the particle size distribution according to the invention provides a system for an extremely robust one-bake at least two layer enamelling process which is superior to standard multibake enamelling processes in regard to its suitability for substrates of varying quality and their pretreatment, adjustment of the slip and the baking conditions. Even edge enamelling, which in general is relatively difficult, does not present any problems.

The invention is further illustrated by the following examples.

EXAMPLES 1 TO 6

Ground coat slips numbers 1 to 6 in Table 2 were prepared from the ground coat frits A, B, C and D having the chemical analysis indicated in Table 1. To this end, the frit constituents, the mill additions and the additives were ground in a ball mill to a fineness equivalent to a residue of less than 5% on a 3600 mesh/cm$^2$ sieve. Each of the slips was then applied to a steel plate pretreated by a standard pickling process.

A white enamel slip (Examples 1 to 6) was obtained by grinding a frit having the following chemical composition: 44% of SiO$_2$, 17% of B$_2$O$_3$, 7.5% of Na$_2$O, 7.8% of K$_2$O, 1% of Li$_2$O, 1.2% of ZrO$_2$, 19% of TiO$_2$, 1.2% of P$_2$O$_5$ and 1.3% of F, with mill additions of 3.5 parts of clay, 1.5 parts of highly disperse SiO$_2$, 0.3 part of NaAlO$_2$, 0.2 part of K$_2$CO$_3$ and 45 parts of water to 100 parts of frit (percentages by weight and parts by weight).

The white enamel slip was applied to the metal plates coated with the 6 ground coat slips and then dried. The whole was then baked in the usual way for 3 minutes at 820° C.

TABLE 1

| Composition | Frit A | Frit B | Frit C | Frit D |
|---|---|---|---|---|
| SiO$_2$ | 48 | 46 | 37 | 47 |
| Al$_2$O$_3$ | 6 | 7 | 4 | 4 |
| B$_2$O$_3$ | 16 | 15 | 19 | 6 |
| Na$_2$O | 19 | 14 | 15 | 18 |
| K$_2$O | 4 | 3 | 4 | 2 |
| CaO | 5.2 | 6.7 | 10 | 10 |
| NiO | 1.3 | 0.4 | 1.5 | 1 |
| CoO | 0.3 | 0.4 | 0.5 | 0.2 |
| MnO | — | — | — | 1 |
| P$_2$O$_5$ | — | 2.1 | 0.6 | 2 |
| BaO | — | 1.4 | 4 | 6 |
| Fe$_2$O$_3$ | — | 2 | — | 0.4 |
| CuO | — | — | 0.2 | — |
| F$^-$ | 1.2 | 2 | 4.2 | 6.2 |

(figures in parts by weight)

TABLE 2

| | Ground coat slip number | | | | | |
|---|---|---|---|---|---|---|
| | 1 | 2 | 3 | 4 | 5 | 6 |
| Frit: A | 25 | 25 | 20 | 20 | 30 | 30 |
| B | 25 | 25 | 20 | 20 | 40 | 30 |
| C | 50 | 50 | 40 | 40 | 30 | 40 |
| D | — | — | 20 | 20 | — | — |
| Mill additions: | | | | | | |
| SiO$_2$ (quartz) | 15 | 10 | 15 | 10 | — | 10 |
| Clay | 3 | 6 | — | 5 | 7 | 7 |
| NaNO$_2$ | 0.1 | 0.1 | 0.1 | 0.1 | 0.1 | 0.1 |
| NaAlO$_2$ | 0.3 | — | 0.8 | 0.3 | 0.2 | 0.2 |
| Na$_4$B$_2$O$_7$.10H$_2$O | 0.1 | 0.3 | 0.1 | — | 0.1 | 0.2 |
| K—feldspar | — | 5 | — | — | 5 | — |
| Ca—silicate hydrate | 0.5 | — | 0.5 | — | — | — |
| H$_2$O | 45 | 50 | 40 | 45 | 45 | 50 |
| Examples of additives according to the invention: | | | | | | |
| ε-caprolactam | 0.05 | — | 0.05 | — | 0.5 | — |
| Glycine | — | 0.5 | — | — | 1 | — |
| Pyridine-2,5-dicarboxylic acid | 0.5 | — | — | 0.8 | — | — |
| Dodecane lactam | — | — | 0.1 | 0.7 | — | — |

(figures in parts by weight)

EXAMPLES 7 TO 18

A semi-opaque enamel slip was ground using a frit having the following composition: 45% of SiO$_2$, 10% of Al$_2$O$_3$, 14.5% of B$_2$O$_3$, 4.9% of TiO$_2$, 12% of Na$_2$O, 4.3% of K$_2$O, 4.1% of CaO and 5.2% of F, in the presence of 4 parts of clay, 0.5 part of K$_2$CO$_3$, 40 parts of water and 5 parts of pigment of 100 parts of frit. Various standard commercial rutile and/or spinel pigments were used as the pigments. Each of the slips was applied to 6 metal plates coated with ground coat slips, dried and baked in the same way as in Examples 1 to 6.

EXAMPLES 19 TO 24

Cadmium sulphide and cadmium sulphoselenide pigments were used in a transparent enamel slip prepared from a frit having the following composition: 53% of SiO$_2$, 10.3% of Al$_2$O$_3$, 14.5% of B$_2$O$_3$, 12% of Na$_2$O, 4.3% of K$_2$O, 4.1% of CaO and 1.8% of F, in the presence of 4 parts of clay, 0.3% of K$_2$CO$_3$, 40 parts of water and 4 parts of various standard commercial silicate pigments.

The slips were applied to metal plates coated with ground coat slips, dried and baked in the same way as in Examples 1 to 6.

EXAMPLE 25

An intermediate white containing 0.25 parts of caprolactam added in accordance with the invention was applied to the ground coat biscuit according to Example 5 using slip No. 5 according to Table 2, followed by drying. A majolica slip having the following composition: 46% of $SiO_2$, 3% of $Al_2O_3$, 14% of $B_2O_3$, 19% of $Na_2O$, 3% of $K_2O$, 2% of MnO, 7% of $Fe_2O_3$, 4% of $TiO_2$ and 2% of F, was then applied to this two-layer biscuit, followed by drying and baking.

Enamels Nos. 1 to 25 were free from cracks and blisters. No peeling off from the steel plate substrate was observed in impact tests. No enamelling faults, such as pinholes or black spots, were observed; the enamel finishes were satisfactory.

EXAMPLE 26

A ground coat of the following composition (standard raw materials): $SiO_2$ 39.1% by weight, $Al_2O_3$ 1% by weight, $B_2O_3$ 16% by weight, $Na_2O$ 6% by weight, $K_2O$ 3% by weight, $Li_2O$ 3% by weight, BaO 21% by weight, CaO 4% by weight, ZrO 1% by weight, $P_2O_5$ 0.5% by weight, CoO 0.7% by weight, NiO 2.5% by weight and CuO 0.5% by weight, was melted and granulated by pouring out into a water bath. The water bath contained a quantity of dissolved glycine such that 0.2% by weight of the additive adhered to the dried frit (granulate).

70 parts by weight of this frit and 30 parts by weight of a frit A which had been coated with 0.3 part by weight of glycine were ground together with 15 parts by weight of $SiO_2$ (quartz), 3 parts by weight of clay, 0.1 part by weight of $NaNO_2$, 0.3 part by weight of $NaAlO_2$, 0.1 part by weight of $Na_4B_2O_7.10H_2O$, 0.5 part by weight of Ca-silicate hydrate and 45 parts by weight of water in a ball mill to a fineness equivalent to a residue of less than 3% by weight on a 244-mesh sieve (10,000 meshes/$cm^2$).

The slip was sprayed onto a steel plate which had been degreased in the usual way. The steel plate was 2 mm thick and had been bent through 90° (bending radius 2 mm).

The cover coat corresponding to Examples 1 to 6 was then applied and baked in the same way as described therein. The enamel finish obtained was faultless and showed no signs of peeling off, even along the bend.

It will be appreciated that the instant specification and examples are set forth by way of illustration and not limitation, and that various modifications and changes may be made without departing from the spirit and scope of the present invention.

We claim:

1. In the enamelling of metal by applying a ground coat containing an additive, subsequently applying a cover coat, and baking the structure, the improvement which comprises employing as the additive a complexing agent having a solubility in water at 25° C. and at a pH-value of from 4 to 9 of greater than about 0.05 g/l, with the exception of saccharides and their oxidation, reduction and modification products and polyethylene glycol containing up to 50 carbon atoms per molecule.

2. A process as claimed in claim 1, wherein the additive contains more than 3 carbon atoms per molecule.

3. A process as claimed in claim 1, wherein the additive is present in about 0.1 to 3% by weight.

4. A process as claimed in claim 1, wherein the ground coat powder has a particle size below about 60μ.

5. A process as claimed in claim 1, wherein the ground coat by weight approximately comprises

| | | |
|---|---|---|
| $SiO_2$ | 30–50% | } total 33–53% |
| ZrO | 0–8% | |
| $B_2O_3$ | 5–21% | } total 33–40% |
| BaO | 14–25% | |
| ZnO | 0–5% | |
| F | 0–4% | |
| alkali metal oxides | 10–15% | |
| adhesive oxides | 1–4% | |
| CaO | 0–5% | } total 0% by weight |
| SrO | 0–5% | |
| $TiO_2$ | 0–5% | |
| $Fe_2O_3$ | 0–5% | |
| $P_2O_5$ | 0–2% | |

6. A process as claimed in claim 1, including applying at least one additional coat between the ground and cover coats, the additional coat also containing the complexing agent.

7. A process as claimed in claim 5, including applying at least one additional coat between the ground and cover coats, the additional coat also containing the complexing agent, the additive containing more than 4 carbon atoms per molecule and being present in about 0.1 to 1.5% by weight of each coat which coats have a particle size below about 60μ.

8. An enamel frit suitable for one-bake at least two layer enamelling surface-coated at least partly with a complexing agent having a solubility in water at 25° C. and at a pH-value of from 4 to 9 of greater tha about 0.05 g/l, with the exception of saccharides and their oxidation, reduction and modification products and polyethylene glycol containing up to 50 carbon atoms per molecule.

9. An enamel frit as claimed in claim 8, wherein the coating substance is present in about 0.1 to 3% by weight of the frit.

10. An enamel frit as claimed in claim 9, by weight approximately comprising

| | | |
|---|---|---|
| SiO | 30–50% | } total 3–53% |
| ZrO | 0–8% | |
| $B_2O_3$ | 5–21% | } total 33–40% |
| BaO | 14–25% | |
| ZnO | 0–5% | |
| F | 0–4% | |
| alkali metal oxides | 10–15% | |
| adhesive oxides | 1–4% | |
| CaO | 0–5% | } total 0–7% |
| SrO | 0–5% | |
| $TiO_2$ | 0–5% | |
| $Fe_2O_3$ | 0–5% | |
| $P_2O_5$ | 0–2% | |

11. An enamel frit as claimed in claim 10, having a particle size below about 60μ, the additive containing more than 4 carbon atoms per molecule and being present in about 0.15 to 2.2% by weight.

* * * * *

UNITED STATES PATENT AND TRADEMARK OFFICE
CERTIFICATE OF CORRECTION

PATENT NO. : 4,486,542
DATED : December 4, 1984
INVENTOR(S) : Otto Krist, et al

It is certified that error appears in the above-identified patent and that said Letters Patent is hereby corrected as shown below:

Col. 5, line 45      Correct spelling of "Examples"

Col. 7, line 32      Before "frit" delete "a"

Col. 8, line 50      Third column delete "total 3-53%" and substitute --total 33-53%--

Signed and Sealed this

Eleventh Day of June 1985

[SEAL]

Attest:

DONALD J. QUIGG

Attesting Officer      Acting Commissioner of Patents and Trademarks